(12) United States Patent
Ugajin et al.

(10) Patent No.: US 8,784,546 B2
(45) Date of Patent: Jul. 22, 2014

(54) W/O-TYPE EMULSION INK COMPOSITION FOR WRITING UTENSIL AND WRITING UTENSIL

(75) Inventors: Makoto Ugajin, Tokyo (JP); Eriko Nemoto, Tokyo (JP); Makoto Fuse, Tokyo (JP); Taku Fukai, Tokyo (JP)

(73) Assignee: Zebra Co., Ltd. (JP)

( * ) Notice: Subject to any disclaimer, the term of this patent is extended or adjusted under 35 U.S.C. 154(b) by 111 days.

(21) Appl. No.: 13/580,261

(22) PCT Filed: Dec. 27, 2010

(86) PCT No.: PCT/JP2010/073627
§ 371 (c)(1),
(2), (4) Date: Sep. 18, 2012

(87) PCT Pub. No.: WO2011/104994
PCT Pub. Date: Sep. 1, 2011

(65) Prior Publication Data
US 2013/0200307 A1    Aug. 8, 2013

(30) Foreign Application Priority Data
Feb. 26, 2010   (JP) ................. P2010-042314

(51) Int. Cl.
*C09D 11/16*   (2014.01)
(52) U.S. Cl.
USPC .......................................... 106/31.26
(58) Field of Classification Search
USPC ........................................ 106/31.26, 31.15
See application file for complete search history.

(56) References Cited

U.S. PATENT DOCUMENTS

| | | | | |
|---|---|---|---|---|
| 5,945,484 A * | 8/1999 | Fukasawa | ........... | 106/31.26 |
| 6,149,720 A * | 11/2000 | Asada et al. | ........... | 106/31.26 |
| 6,632,273 B2 * | 10/2003 | Hayashi et al. | ........... | 106/31.26 |
| 7,655,082 B2 * | 2/2010 | Zhu | ........... | 106/31.26 |
| 2007/0050927 A1 | 3/2007 | Cole et al. | | |

FOREIGN PATENT DOCUMENTS

| | | | | |
|---|---|---|---|---|
| CN | 101611104 A | 12/2009 | | |
| JP | 62-32150 A | 2/1987 | | |
| JP | 6-25584 A | 2/1994 | | |
| JP | 10-158561 A | 6/1998 | | |
| JP | 10-158566 A | 6/1998 | | |
| JP | 10-158568 A | 6/1998 | | |
| JP | 11049997 A * | 2/1999 | ............ | C09D 11/02 |
| JP | 2001-200185 A | 7/2001 | | |
| JP | 2005-23207 A | 1/2005 | | |
| JP | 2006-328093 A | 12/2006 | | |
| JP | 2007-204573 A | 8/2007 | | |
| JP | 2007-327003 A | 12/2007 | | |
| JP | 2009-507949 A | 2/2009 | | |
| JP | 2009-185153 A | 8/2009 | | |
| JP | 2013/234259 | * 11/2013 | | |
| KR | 2001-0040768 A | 5/2001 | | |

OTHER PUBLICATIONS

English translation of JP 11/049997; Feb. 1999.*

(Continued)

*Primary Examiner* — Helene Klemanski
(74) *Attorney, Agent, or Firm* — Cantor Colburn LLP

(57) ABSTRACT

A W/O-type emulsion ink composition for a writing tool having an aqueous component dispersed in an oil component, the oil component including a fluorescent coloring agent, and the aqueous component including a fluorescent whitening agent and water.

8 Claims, 1 Drawing Sheet

(56) References Cited

OTHER PUBLICATIONS

Chinese Office Action for Chinese Application Serial No. 201080064875.8; Office Action dated: Jul. 29, 2013, no Translation.
International Search Report for International Application No. PCT/JP2010/073627, mailed Jan. 25, 2011, with English translation.
Notice of Allowance for ChinesePatent Application No. 201080064875.8, Date of Mailing Apr. 1, 2014 with partial English translation.
Office Action for Japanese Patent Application No. 2010-42314; Date of Mailing Apr. 1, 2014, with partial English translation.
Notice of Allowance for Korean Patent Application No. 10-2012-7024766; dated Apr. 30, 2014 with partial English translation.

* cited by examiner

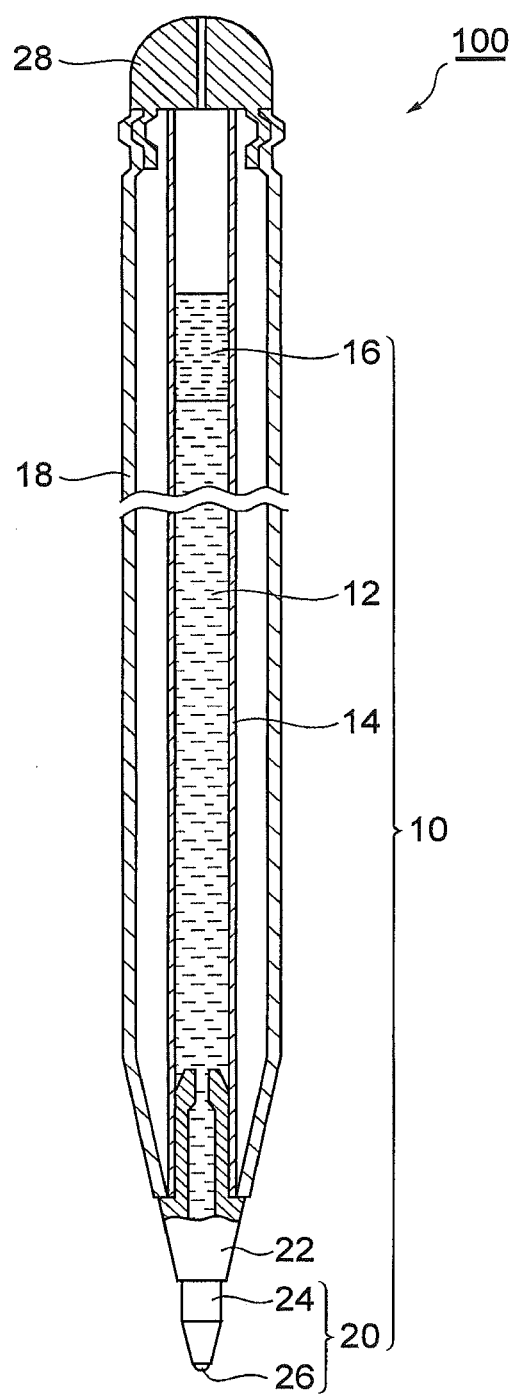

W/O-TYPE EMULSION INK COMPOSITION FOR WRITING UTENSIL AND WRITING UTENSIL

CROSS REFERENCE TO RELATED APPLICATIONS

This is a U.S. national stage of application No. PCT/JP2010/073627, filed on 27 Dec. 2010. Priority under 35 U.S.C. §119(a) and 35 U.S.C. §365(b) is claimed from Japanese Application No. 2010-042314, filed 26 Feb. 2010, the disclosure of which are also incorporated herein by reference.

TECHNICAL FIELD

The present invention relates to a W/O-type emulsion ink composition for a writing tool, and to a writing tool.

BACKGROUND ART

The common inks for writing tools such as ball-point pens are aqueous inks and oil-based inks, and in recent years there have been proposed W/O-type emulsion inks, having an aqueous component dispersed in an oil component. Oil-based inks generally tend to have heavier writing performance. With aqueous inks, on the other hand, writing lines tend to dry more slowly and cause smearing of sheet surfaces. In contrast, W/O-type emulsion inks are noted as inks that exhibit both satisfactory writing performance and writing line drying properties.

In Patent document 1, for example, there is proposed a W/O-type emulsion ink composition that has aqueous components including water, a polyhydric alcohol, a thixotropic agent and a pigment, dispersed in an oil component that includes a polar solvent and a stringiness-imparting agent. However, aqueous ink compositions have conventionally been used as fluorescent inks for writing tools, while emulsion ink compositions are not so commonly used at the current time.

CITATION LIST

Patent Literature

[Patent document 1] Japanese Unexamined Patent Application Publication No. 2007-327003

SUMMARY OF INVENTION

Technical Problem

Fluorescent dyes themselves have poor coloring properties and low solubility, and therefore when a fluorescent W/O-type emulsion ink composition for a writing tool is prepared, the use of a fluorescent coloring agent comprising a resin and a resin-coloring dye, for example, is considered effective for improving the coloring properties and solubility of the fluorescent dye. When a fluorescent coloring agent is used, however, it is difficult to prepare a W/O-type emulsion ink with satisfactory emulsified stability. The reason for this is believed to be that the resin in the fluorescent coloring agent adversely affects the emulsified stability.

Emulsifiers are commonly used to improve the stability of emulsions. Based on research by the present inventors, however, it is difficult to improve the emulsified stability even when an emulsifier is added to a W/O-type emulsion ink employing a fluorescent coloring agent.

It is an object of the present invention, which has been accomplished in light of the circumstances described above, to provide a W/O-type emulsion ink composition for a writing tool that has satisfactory dispersibility of the aqueous component in the oil component, even when using a fluorescent coloring agent, and that has excellent emulsified stability of the emulsion, as well as excellent writing performance. It is another object of the invention to provide a writing tool with satisfactory writing performance.

Solution to Problem

The present inventors have examined the use of different components with the aim of achieving the object stated above. It was found that when a fluorescent coloring agent is used, specific components are effective for improving the emulsified stability of the emulsion, and the invention has been completed upon this finding. Specifically, the invention provides a W/O-type emulsion ink composition for a writing tool having an aqueous component dispersed in an oil component, the oil component including a fluorescent coloring agent, and the aqueous component including a fluorescent whitening agent and water.

The W/O-type emulsion ink composition for a writing tool of the invention has satisfactory dispersibility of the aqueous component in the oil component, and has excellent emulsified stability of the emulsion, as well as excellent writing performance. The reason for this effect is conjectured by the present inventors to be as follows. According to the invention, a fluorescent coloring agent is used to improve the solubility of the fluorescent dye in the oil component. Presumably, this can inhibit reduction in emulsified stability by the fluorescent coloring agent, and increase the stability of the emulsion. As an additional separate factor, interaction between the fluorescent coloring agent in the oil component and the fluorescent whitening agent in the aqueous component reduces the sizes of the droplets composed of the aqueous component, thereby improving the stability of the emulsified state. Due to these factors, it is conjectured, the dispersibility of the aqueous component is satisfactory and it is possible to form a W/O-type emulsion ink composition with excellent emulsified stability of the emulsion and excellent writing performance.

The fluorescent whitening agent in the W/O-type emulsion ink composition for a writing tool of the invention preferably has a stilbene structure. By using such a fluorescent whitening agent it is possible to further improve the emulsified stability of the emulsion.

The pH of the aqueous component in the W/O-type emulsion ink composition for a writing tool of the invention is preferably 8.9 or higher. By including an aqueous component in this range of pH, it is possible to achieve higher levels for both the emulsified stability of the emulsion and the writing performance obtained when writing.

The mass ratio of the oil component with respect to the aqueous component in the W/O-type emulsion ink composition for a writing tool of the invention is preferably between 1.5 and 4. By including the oil component and aqueous component in this mass ratio, it is possible to achieve even higher levels for both the emulsified stability of the emulsion and the writing performance obtained when writing.

According to the invention there is further provided a writing tool comprising the aforementioned W/O-type emulsion ink composition for a writing tool. Since the writing tool of the invention has a W/O-type emulsion ink composition for a writing tool with the features described above, it is possible to draw fluorescent-colored writing lines with satisfactory writing performance.

Advantageous Effects of Invention

According to the invention it is possible to provide a W/O-type emulsion ink composition for a writing tool which has satisfactory dispersibility of the aqueous component in the oil component, even when using a fluorescent coloring agent, and which has excellent emulsified stability of the emulsion, and excellent writing performance. It is also possible to provide a writing tool with satisfactory writing performance.

BRIEF DESCRIPTION OF DRAWINGS

FIG. 1 is a schematic cross-sectional view of a ball-point pen as an embodiment of the writing tool of the invention.

DESCRIPTION OF EMBODIMENTS

Preferred embodiments of the invention will now be explained with reference to the accompanying drawings where necessary.

The W/O-type emulsion ink composition for a writing tool according to this embodiment is a W/O-type emulsion ink composition for a writing tool having an aqueous component dispersed in an oil component, the oil component including a fluorescent coloring agent, and the aqueous component including a fluorescent whitening agent and water. Each of the components in the W/O-type emulsion ink composition of this embodiment (hereunder also referred to simply as "ink composition") will now be described.

The oil component includes a fluorescent coloring agent. Fluorescent coloring agents include resins, and also resins that have been dyed with fluorescent dyes. Specific examples of fluorescent dyes include Color Index No. (hereunder, "C.I.") Basic Yellow 1 and 40, C.I. Basic Red 1 and 13, C.I. Basic Violet 7 and 10, C.I. Basic Orange 22, C.I. Basic Blue 7, C.I. Basic Green 1, C.I. Acid Yellow 3 and 7, C.I. Acid Red 52, 77, 87 and 92, C.I. Acid Blue 9, C.I. Disperse Yellow 121, 82 and 83, C.I. Disperse Orange 11, C.I. Disperse Red 58, C.I. Disperse Blue 7, C.I. Direct Yellow 85, C.I. Direct Orange 8, C.I. Direct Red 9, C.I. Direct Blue 22, C.I. Direct Green 6, C.I. Fluorescent Brightening Agent 55, C.I. Fluorescent Brightening Whitex WS 52, C.I. Fluorescent 162 and 112, C.I. Solvent Yellow 44, C.I. Solvent Red 49, C.I. Solvent Blue 5, C.I. Solvent Pink, and C.I. Solvent Green 7. Any of these may be used alone or in combinations of two or more.

A resin dyed with a fluorescent dye is preferably at least one selected from among sodium sulfonated styrene-divinylbenzene copolymers, polyamide resins, formaldehyde-benzoguanamine resins and formaldehyde-p-toluenesulfonamide resins. By using a fluorescent coloring agent comprising such a resin, it is possible to increase the solubility in the oil component and improve the coloring properties. The fluorescent coloring agent may be prepared by a known method, or a commercial product may be purchased.

The content of the fluorescent coloring agent is preferably 10.0-35.0 mass % and more preferably 15.0-30.0 mass % based on the total mass of the ink composition. If the fluorescent coloring agent content is less than 10.0 mass %, it will tend to be difficult to obtain sufficient coloring properties. If the fluorescent coloring agent content is greater than 30.0 mass %, on the other hand, the excellent stability of the ink composition over time will tend to be impaired.

The oil component may also contain components that are commonly used as oil components in ink compositions. For example, the oil component may include a polar solvent. The polar solvent used may be any polar solvent used in ink compositions, without any particular restrictions. Examples of polar solvents include glycol ethers such as ethyleneglycol monophenyl ether (phenyl glycol), propyleneglycol monophenyl ether, propyleneglycol dipropyleneglycol monomethyl ether, dipropyleneglycol monoethyl ether, dipropyleneglycol monobutyl ether and tripropyleneglycol monomethyl ether, and alcohols such as benzyl alcohol, ethylene glycol, triethylene glycol, propylene glycol and polyethylene glycol. Any of these may be used alone or in combinations of two or more.

The polar solvent content is preferably 25.0-60.0 mass % and more preferably 35.0-55.0 mass %, based on the total mass of the ink composition. If the polar solvent content is less than 25.0 mass %, the viscosity will tend to be increased and the writing performance impaired. If the polar solvent content is less than 60.0 mass %, on the other hand, it will tend to be difficult to obtain sufficient coloring properties.

The oil component may further include a stringiness-imparting agent. Examples of stringiness-imparting agents include polyvinylpyrrolidone, polyvinyl alcohol, polyethylene oxide and hydroxypropylcellulose. These may be used alone or in combinations of two or more. Using a stringiness-imparting agent can prevent blotting during writing or leaking of the ink when standing. It will also impart suitable viscoelasticity to the ink, so that an effect of smooth writing performance can be obtained.

The stringiness-imparting agent content is preferably 0.5-3.0 mass % and more preferably 0.6-2.5 mass %, based on the total mass of the ink composition. A stringiness-imparting agent content of less than 0.5 mass % will tend to result in blotting during writing or leaking of the ink when standing. On the other hand, a stringiness-imparting agent content of greater than 3.0 mass % will tend to increase the viscosity of the ink composition and cause thin writing spots.

The oil component may also contain additives. Examples of additives include viscosity modifiers (resins and the like), lubricants, pigments, antioxidants and vegetable oils. Examples of viscosity modifiers include ketone resins, sulfoamide resins, mallein resins, xylene resins, amide resins, alkyd resins, phenol resins, rosin resins, terpene resins, butyral resins and the like. Examples of lubricants that may be used include higher fatty acids such as oleic acid, and phosphoric acid ester-based lubricants.

Examples of such pigments include common organic pigments such as carbon black, insoluble azo-based, azo lake-based, fused azo-based, diketopyrrolopyrrole-based, phthalocyanine-based, quinacridone-based, anthraquinone-based, dioxazine-based, indigo-based, thioindigo-based, quinophthalone-based, threne-based and isoindolinone-based pigments.

The oil component may also include a different oil-soluble dye from the fluorescent dye mentioned above, as a coloring agent. As oil-soluble dyes there may be used any publicly known compounds, without any particular restrictions. Examples of such oil-soluble dyes include direct dyes, acidic dyes and basic dyes. More specifically, examples include Spirit Black 61F, Valifast Violet 1701, Valifast Violet 1704, Valifast Yellow 1109, Valifast Blue 1605, Valifast Blue 1621, Valifast Blue 1623, Valifast Red 1320, Valifast Red 1360 and Valifast Red 2320 (all products of Orient Chemical Industries, Ltd.), Aizen Spilon Black GMH Special, Aizen Spilon violet C-RH, Aizen Spilon Yellow C-GH new, Aizen Spilon Blue C-RH, Aizen Spilon S.P.T. Blue-111 and Aizen Spilon S.P.T. Blue-121 (all products of Hodogaya Chemical Co., Ltd.). Any of these may be used alone or in combinations of two or more.

The aqueous component in the ink composition of this embodiment includes a fluorescent whitening agent and water. The water content is preferably 5.0-30.0 mass % and more preferably 10.0-25.0 mass %, based on the total mass of the ink composition. If the water content is less than 5.0 mass %, the excellent stability over time will tend to be somewhat impaired. If the water content is greater than 30.0 mass %, on the other hand, sufficiently excellent writing performance will tend to be impaired, depending on the types of the other components.

A fluorescent whitening agent, as referred to herein, is a chemical substance that absorbs ultraviolet rays in the near-ultraviolet range and emits violet-blue fluorescence. From the viewpoint of further improving the emulsified stability of the emulsion, the fluorescent whitening agent preferably comprises one or more selected from among stilbene derivatives, imidazole derivatives and coumarin derivatives, and more preferably stilbene derivatives. Stilbene derivatives include compounds having a stilbene structure (1,2-diphenylethylene structure), and specifically, bistriazinylaminostilbene-based compounds such as Fluorescent-24 and 4,4'-bistriazinylaminostilbene-2,2'-disulfonic acid derivatives. The stilbene structure may be a trans-stilbene structure or cis-stilbene structure, but it is preferably a trans-stilbene structure.

From the viewpoint of improving the emulsified stability of the emulsion, the stilbene derivative is preferably a sulfonic acid salt, and more preferably one having the structure represented by the following formula (1).

[Chemical Formula 1]

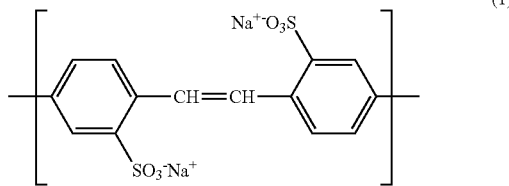

(1)

Specific examples of suitable fluorescent whitening agents include Kayaphor SN conc., Kayaphor CR200, Kayaphor AS 150, Kayaphor FB conc., Kayaphor PBS, Kayaphor ES Liquid, Kayaphor FB Liquid, Kayaphor STC Liquid, Kayaphor FKY Liquid, Kayaphor PASQ Liquid, Kayaphor EXN Liquid, Kayaphor HBC Liquid, Kayaphor PBS Liquid, Kayaphor JB Liquid and Kayaphor AS Liquid (all trade names of Nippon Kayaku Co., Ltd.), and Hakkol OW-11, Hakkol OW-119, Hakkol BE cone, Hakkol SG cone 150 and Hakkol S-100 (all trade names of Showa Chemical Industry Co., Ltd.).

The fluorescent whitening agent content is preferably 0.01-3.0 mass % and more preferably 0.02-2.0 mass % based on the total mass of the ink composition. If the fluorescent whitening agent content is less than 0.01 mass % or greater than 3.0 mass %, sufficiently excellent stability of the ink composition over time will tend to be impaired.

The mass ratio of the fluorescent whitening agent with respect to the fluorescent coloring agent is preferably 0.001-0.08 and more preferably 0.002-0.02. If the mass ratio is between 0.001 and 0.08, the particle sizes of the water droplets of the aqueous component will be sufficiently reduced, allowing more satisfactory dispersibility of the emulsion. If the mass ratio is between 0.002 and 0.02, the dispersibility of the emulsion will be even more satisfactory, and the stability over time can be even further improved.

The aqueous component may include a coloring agent. The coloring agent may be any known one without any particular restrictions, and both pigments and dyes may be used. Examples of such pigments include common organic pigments such as carbon black, insoluble azo-based, azo lake-based, fused azo-based, diketopyrrolopyrrole-based, phthalocyanine-based, quinacridone-based, anthraquinone-based, dioxazine-based, indigo-based, thioindigo-based, quinophthalone-based, threne-based and isoindolinone-based pigments. Any of these may be used alone or in combinations of two or more. The use of a pigment can produce dense, clear writing, as well as sufficient lightfastness of written ink.

Examples of dyes that may be used include water-soluble dyes such as direct dyes, acidic dyes and basic dyes. Such direct dyes include, using their color number indexes as reference, Color Index (hereunder also referred to as "C.I.") Direct Black 17, 19, 38 and 154, C.I. Direct Yellow 1, 4, 12 and 29, C.I. Direct Orange 6, 8, 26 and 29, C.I. Direct Red 1, 2, 4 and 13, and C.I. Direct Blue 2, 6, 15, 78 and 87. Acidic dyes include C.I. Acid Black 2 and 31, C.I. Acid Yellow 3, 17, 23 and 73, C.I. Acid Orange 10, C.I. Acid Red 13, 14, 18, 27, 52, 73, 87 and 92, and C.I. Acid Blue 1, 9, 74 and 90. Basic dyes include C.I. Basic Yellow 2 and 3, C.I. Basic Red 1, 2, 8 and 12, C.I. Basic Violet 1, 3 and 10, and C.I. Basic Blue 5, 9 and 26. Any of these may be used alone or in combinations of two or more. The aqueous component may also contain the same dye as the fluorescent dye in the fluorescent coloring agent described above.

The coloring agent content of the aqueous component is preferably 0.5-10.0 mass % and more preferably 1.0-5.0 mass %, based on the total mass of the ink composition. If the coloring agent content is less than 0.5 mass %, the writing line clarity will tend to be impaired. If the coloring agent content is greater than 10.0 mass %, on the other hand, the stability of the ink composition over time will tend to be impaired.

When a pigment is included in the aqueous component as a coloring agent, the aqueous component preferably further contains a pigment dispersant. Such pigment dispersants are not particularly restricted so long as they are capable of dispersing the pigment, and examples include water-soluble resins obtained by polymerizing, for example, acrylic acid or its ester, methacrylic acid or its ester or maleic acid or its ester alone, or copolymerizing it with styrene, acrylonitrile, vinyl acetate or the like, and neutralizing the resin with an alkali metal or an amine to render it water-soluble, as well as anionic surfactants, nonionic surfactants and the like. Water-soluble resins are preferred among these, and specifically styrene-maleic acid copolymer is particularly preferred. Any of these may be used alone or in combinations of two or more. Using a pigment dispersant can inhibit pigment deposition and aggregation that can occur with time, and can provide satisfactory stability over time.

The pigment dispersant content is preferably 0.1-5.0 mass % and more preferably 0.5-3.0 mass %, based on the total mass of the ink composition. A pigment dispersant content of less than 0.1 mass % will tend to produce deposition or aggregation of the pigment with time. On the other hand, a pigment dispersant content of greater than 5.0 mass % will tend to increase the viscosity of the ink composition and reduce the writing performance. The pigment and pigment dispersant may be used as a commercially available pigment aqueous dispersion, in which they are pre-mixed with a solvent in a prescribed proportion.

The aqueous component may further include a lubricant. Examples of lubricants include polyalkyleneglycol derivatives, fatty acid salts, nonionic surfactants and phosphoric acid esters. There is preferably included a fatty acid salt, and more preferably potassium oleate. The aforementioned lubricant oils may be used alone or in combinations of two or more. Using a lubricant can further inhibit wear of the ball socket caused by pigments and other components.

The lubricant content is preferably 0.1-5.0 mass %, based on the total mass of the ink composition. If the lubricant content is less than 0.1 mass % the effect of inhibiting wear of the ball socket will tend to be reduced. If the lubricant content is greater than 5.0 mass %, on the other hand, the stability of the ink composition over time will tend to be reduced.

The aqueous component may also include other additives in addition to the components mentioned above. Examples of such additives include rust-preventive agents, antimicrobial agents, humectants, pH regulators and the like. Examples of rust-preventive agents that may be used include benzotriazole, tolyltriazole, octyl phosphate, imidazole, benzimidazole, ethylenediaminetetraacetic acid salts and the like. Examples of antimicrobial agents that may be used include pentachlorophenol sodium, sodium benzoate, potassium sorbate, sodium dehydroacetate, 1,2-benzoisothiazolin-3-one, 2,4-thiazolylbenzimidazole, paraoxybenzoic acid esters and the like.

Examples of humectants that may be used include glycerin, propylene glycol, urea, thiourea and ethyleneurea. Examples of pH regulators that may be used include triethanolamine, diethanolamine, monoethanolamine, ammonia water, sodium hydroxide, potassium hydroxide, sodium carbonate and sodium hydrogencarbonate.

The pH of the aqueous component is preferably 8.9 or higher, more preferably 8.9-11 and even more preferably 8.9-10. If the pH of the aqueous component is below 8.9, it will tend to be difficult to achieve high levels for both the emulsified stability of the emulsion and the writing performance. If the pH of the aqueous component exceeds 11, on the other hand, production will tend to be hampered. The pH of the aqueous component can be measured using a commercially available pH meter, before mixture with the oil component.

The mass ratio of the oil component with respect to the aqueous component (oil component/aqueous component) in the ink composition of this embodiment is preferably 1.5 to 4, more preferably 1.8 to 3 and even more preferably 2 to 2.5. If the mass ratio of the oil component is too large, the stability of the ink composition over time will tend to be impaired. If the mass ratio of the oil component is too small, on the other hand, more thin writing spots will tend to be produced.

The mean particle size of water droplets of the aqueous component is preferably 0.1 to 1 μm and more preferably 0.5 to 1 μm. An ink composition containing water droplets with this mean particle size range will exhibit even more excellent stability over time. The mean particle size of water droplets in the ink composition can be determined as the arithmetic mean value of the particle sizes of 10 arbitrarily selected particles observed under magnification (250×) of the ink composition with a commercially available optical microscope.

The ink composition of this embodiment can be obtained as a W/O-type emulsion ink with water droplets composed of the aqueous component dispersed in the oil component, by separately preparing the oil component and the aqueous component, and then mixing the oil component and the aqueous component.

Mixture of the oil component and aqueous component can be accomplished, for example, using an agitator such as a dissolver, Henschel mixer or homomixer. There are no particular restrictions on the stirring conditions, and for example, a dissolving agitator may be used for agitation at 100-1000 rpm for 30-180 minutes to form a W/O-type emulsion ink composition having water droplets composed of the aqueous component uniformly dispersed in the oil component.

The aqueous component in the ink composition of this embodiment has excellent dispersibility, and water droplets composed of the aqueous component, having essentially uniform particle sizes, can be essentially uniformly dispersed in the oil component. By using such an ink composition it is possible to obtain a writing tool with excellent writing performance even when a fluorescent-color W/O-type emulsion ink composition has been prepared. The ink composition of this embodiment also has excellent emulsion stability over time, and excellent writing performance can be maintained for long periods of time.

A preferred embodiment of a writing tool comprising the aforementioned W/O-type emulsion ink composition for a writing tool will now be described.

FIG. 1 is a schematic cross-sectional view of a ball-point pen as an embodiment of the writing tool of the invention. In the ball-point pen 100 shown in FIG. 1, a W/O-type emulsion ink composition for a writing tool 12 is filled into an ink holding tube 14. A ball-point pen tip 20 is provided at one end of the ink holding tube 14. The ball-point pen tip 20 is composed of a ball holder 24 and a ball 26, and it is anchored to one end of the ink holding tube 14 by a joint 22. A backflow preventer 16 is housed adjacent to the ink composition 12 in the ink holding tube 14, opposite the ball-point pen tip 20 end of the ink composition 12. The backflow preventer 16 is situated in such a manner that no gap is formed between it and the ink composition 12.

Also, a core 10 is formed in the ball-point pen 100 by the ink holding tube 14, ball-point pen tip 20, ink composition 12 and backflow preventer 16. The core 10 is mounted inside the main body axis 18. A pallet 28 with an open hole is fitted at the back end of the main body axis 18 (the end opposite the ball-point pen tip 20).

The constituent elements of the ball-point pen 100 will be described below, but except for the ink composition 12, common constituent elements ordinarily used in ball-point pens may be applied to this construction.

The ink holding tube 14 may be made of a resin such as polypropylene, polyethylene, polyethylene terephthalate, nylon, polyacetal, polycarbonate or the like, or it may be made of metal. There are no particular restrictions on the shape of the ink holding tube 14, and a cylindrical shape, for example, may be employed.

The backflow preventer 16 has a function of preventing outflow of the ink composition (an outflow preventing function) and a function of preventing dry-up of the ink composition (a sealing function), and any known backflow preventer having such functions may be used without any particular restrictions. The backflow preventer 16 may comprise a base oil and a thickener, for example. As base oils there may be mentioned mineral oils, polybutene, silicon oil, glycerin, polyalkylene glycol and the like. As thickeners there may be mentioned metal soap-based thickeners, organic thickeners, inorganic thickeners and the like.

A member made of a plastic material such as polypropylene, for example, may be used for the main body axis 18 and pallet 28.

The joint 22 may be made of, for example, polypropylene, polyethylene, polyethylene terephthalate, nylon, polyacetal, polycarbonate or the like.

The joint 22, ball holder 24 and ball 26 in the ball-point pen tip 20 may be ones that are commonly used in ball-point pens. The diameter of the ball 26 is preferably 0.3-1.2 mm.

Since the ball-point pen of this embodiment employs an ink composition 12 having the features described above, it can draw fluorescent color writing lines with satisfactory writing performance. In addition, since the ink composition 12 has excellent emulsion stability, initial thin writing spots and blots are satisfactorily inhibited even after prolonged storage. It is also possible to satisfactory inhibit wear of the ball 26 and of the ball socket section of the ball holder 24.

The ball-point pen 100 of this embodiment having the construction described above may be produced by a production process for ordinary ball-point pens.

The embodiments described above are only preferred embodiments of the ball-point pen, and the ball-point pen is not limited to these embodiments. For example, the writing tool of the invention may be a ball-point pen without the main body axis 18, wherein the ink holding tube 14 serves directly as the main body axis. Also, the writing tool of the invention may be a ball-point pen which has a pressing mechanism whereby the ink composition 12 and backflow preventer 16 in the ink holding tube 14 are pressed from the back end (the end opposite the ball-point pen tip 20). The writing tool of the invention may also be a ball-point pen lacking the backflow preventer 16.

Moreover, the writing tool of the invention is not limited to a ball-point pen, and for example, it may be a marking pen, such as a brush pen, or a writing tool employing a valve mechanism at the ink-discharge section. The W/O-type emulsion ink composition of the invention may be used in a variety of writing tools, such as those mentioned above.

EXAMPLES

The present invention will now be explained in greater detail based on examples and comparative examples, with the understanding that the invention is in no way limited to the examples.

Examples 1 to 9, Comparative Examples 1 to 6

The starting materials listed in Table 1, Table 2 and Table 3 below (hereunder referred to collectively as "Tables 1 to 3") were prepared. The starting materials for the oil component and aqueous component were separately combined and mixed with a reciprocal rotary agitator, to separately prepare the oil component and the aqueous component.

Next, a dissolving agitator was used for addition of the aqueous component while stirring the oil component for 1 hour under conditions of room temperature (25° C.), 300 rpm, to obtain W/O-type emulsion ink compositions for Examples 1 to 9 and Comparative Examples 1 to 6, having water droplets composed of the aqueous component dispersed in the oil component. The constitutions of the obtained W/O-type emulsion ink compositions are shown in Tables 1 to 3. The compositions shown in Tables 1 to 3 are represented as contents (mass %) of each starting material (each component) based on the total W/O-type emulsion ink composition mass.

TABLE 1

| | Product name or chemical name | Component name | Example 1 | Example 2 | Example 3 | Example 4 | Example 5 |
|---|---|---|---|---|---|---|---|
| Oil component | FNP-35 Lemon Yellow | Fluorescent coloring agent | 28.00 | — | — | 28.00 | 28.00 |
| | FNP-34 Orange | | — | 17.50 | — | — | — |
| | NKS-1005 Yellow | | — | — | 21.00 | — | — |
| | FM-109 White | | — | 3.50 | — | — | — |
| | PVP K-90 | Stringiness agent | 0.84 | 0.70 | 2.10 | 0.84 | 0.84 |
| | Phenyl glycol | Polar solvent | 31.36 | 37.10 | 35.70 | 31.36 | 31.36 |
| | Benzyl alcohol | | 7.00 | 8.40 | 8.40 | 7.00 | 7.00 |
| | Oleic acid | Lubricant | 0.35 | 0.35 | 0.35 | 0.35 | 0.35 |
| | Alkyl ether phosphate ester | | 0.35 | 0.35 | 0.35 | 0.35 | 0.35 |
| | Heterocyclic compound solution | | 2.10 | 2.10 | 2.10 | 2.10 | 2.10 |
| | Oil component total | | 70.00 | 70.00 | 70.00 | 70.00 | 70.00 |
| Aqueous component | C.I. Pigment Yellow | Pigment | 2.70 | 2.70 | 2.70 | 2.70 | 2.70 |
| | High molecular copolymer | Pigment dispersant | 0.90 | 0.90 | 0.90 | 0.90 | 0.90 |
| | Ion-exchanged water | Water | 15.49 | 15.49 | 15.49 | 15.49 | 15.49 |
| | Glycerin | Humectant | 8.10 | 8.10 | 8.10 | 8.10 | 8.10 |
| | CHELESLITE | Rust inhibitor | 0.54 | 0.54 | 0.54 | 0.54 | 0.54 |
| | SUROUT | Antiseptic agent | 0.15 | 0.15 | 0.15 | 0.15 | 0.15 |
| | Potassium oleate | Lubricant | 0.75 | 0.75 | 0.75 | 0.75 | 0.75 |
| | Laurylamine | | 0.15 | 0.15 | 0.15 | 0.15 | 0.15 |
| | Triethanolamine | pH regulator | 0.15 | 0.15 | 0.15 | 0.15 | 0.15 |
| | Kayaphor SN conc. | Fluorescent whitener | 0.15 | 0.15 | 0.15 | — | — |
| | Kayaphor AS150 | | — | — | — | 0.15 | — |
| | Hakkol OW-11 | | — | — | — | — | 0.15 |
| | Xanthan gum | Gelling agent | 0.11 | 0.11 | 0.11 | 0.11 | 0.11 |
| | Fluorine-based surfactant | Surfactant | 0.21 | 0.21 | 0.21 | 0.21 | 0.21 |
| | Low-molecular weight polyethylene aqueous dispersion | Lubricant | 0.60 | 0.60 | 0.60 | 0.60 | 0.60 |

TABLE 1-continued

| | Product name or chemical name | Component name | Example 1 | Example 2 | Example 3 | Example 4 | Example 5 |
|---|---|---|---|---|---|---|---|
| | Aqueous component total | | 30.00 | 30.00 | 30.00 | 30.00 | 30.00 |
| | Aqueous component pH | | 9.4 | 9.4 | 9.4 | 9.4 | 9.4 |
| Total | | | 100.00 | 100.00 | 100.00 | 100.00 | 100.00 |

Units for contents of components (starting materials) are "mass %", with "—" denoting a content of 0.

TABLE 2

| | Product name or chemical name | Component name | Example 6 | Example 7 | Example 8 | Example 9 |
|---|---|---|---|---|---|---|
| Oil component | FNP-35 Lemon Yellow | Fluorescent coloring agent | — | — | 28.00 | 28.00 |
| | FNP-34 Orange | | 15.00 | 20.00 | — | — |
| | NKS-1005 Yellow | | — | — | — | — |
| | FM-109 White | | 3.00 | 4.00 | — | — |
| | PVP K-90 | Stringiness agent | 0.60 | 0.80 | 0.84 | 0.84 |
| | Phenyl glycol | Polar solvent | 31.80 | 42.40 | 31.36 | 31.36 |
| | Benzyl alcohol | | 7.20 | 9.60 | 7.00 | 7.00 |
| | Oleic acid | Lubricant | 0.30 | 0.40 | 0.35 | 0.35 |
| | Alkyl ether phosphate ester | | 0.30 | 0.40 | 0.35 | 0.35 |
| | Heterocyclic compound solubility | | 1.80 | 2.40 | 2.10 | 2.10 |
| | Oil component total | | 60.00 | 80.00 | 70.00 | 70.00 |
| Aqueous component | C.I. Pigment Yellow | Pigment | 3.60 | 1.80 | 2.70 | 2.70 |
| | High molecular copolymer | Pigment dispersant | 1.20 | 0.60 | 0.90 | 0.90 |
| | Ion-exchanged water | Water | 20.66 | 10.33 | 15.61 | 14.14 |
| | Glycerin | Humectant | 10.80 | 5.40 | 8.10 | 8.10 |
| | CHELESLITE | Rust inhibitor | 0.72 | 0.36 | 0.54 | 0.54 |
| | SUROUT | Antiseptic agent | 0.20 | 0.10 | 0.15 | 0.15 |
| | Potassium oleate | Lubricant | 1.00 | 0.50 | 0.75 | 0.75 |
| | Laurylamine | | 0.20 | 0.10 | 0.15 | 0.15 |
| | Triethanolamine | pH regulator | 0.20 | 0.10 | 0.15 | 0.15 |
| | Kayaphor SN conc. | Fluorescent whitener | 0.20 | 0.10 | 0.03 | 1.50 |
| | Xanthan gum | Gelling agent | 0.14 | 0.07 | 0.11 | 0.11 |
| | Fluorine-based surfactant | Surfactant | 0.28 | 0.14 | 0.21 | 0.21 |
| | Low-molecular weight polyethylene aqueous dispersion | Lubricant | 0.80 | 0.40 | 0.60 | 0.60 |
| | Aqueous component total | | 40.00 | 20.00 | 30.00 | 30.00 |
| | Aqueous component pH | | 9.4 | 9.4 | 9.1 | 9.5 |
| Total | | | 100.00 | 100.00 | 100.00 | 100.00 |

Units for contents of components (starting materials) are "mass %", with "—" denoting a content of 0.

TABLE 3

| | Product name or chemical name | Component name | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Oil component | FNP-35 Lemon Yellow | Fluorescent coloring agent | 28.00 | — | — | 28.00 | 28.00 | — |
| | FNP-34 Orange | | — | 17.50 | — | — | — | 17.50 |
| | NKS-1007 Yellow | | — | — | 21.00 | — | — | — |
| | FM-109 White | | — | 3.50 | — | — | — | 3.50 |
| | PVP K-90 | Stringiness agent | 0.84 | 0.70 | 2.10 | 0.84 | 0.84 | 0.70 |
| | Phenyl glycol | Polar solvent | 31.36 | 37.10 | 35.70 | 29.26 | 29.26 | 37.10 |
| | Benzyl alcohol | | 7.00 | 8.40 | 8.40 | 7.00 | 7.00 | 8.40 |
| | Oleic acid | Lubricant | 0.35 | 0.35 | 0.35 | 0.35 | 0.35 | 0.35 |
| | Alkyl ether phosphate ester | | 0.35 | 0.35 | 0.35 | 0.35 | 0.35 | 0.35 |
| | Heterocyclic compound solubility | | 2.10 | 2.10 | 2.10 | 2.10 | 2.10 | 2.10 |
| | EMULGEN 150 | Emulsifier | — | — | — | 2.10 | — | — |
| | EMULGEN LS-110 | | — | — | — | — | 2.10 | — |
| | Oil component total | | 70.00 | 70.00 | 70.00 | 70.00 | 70.00 | 70.00 |

TABLE 3-continued

|  | Product name or chemical name | Component name | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Aqueous component | C.I. Pigment Yellow | Pigment | 2.70 | 2.70 | 2.70 | 2.70 | 2.70 | 2.70 |
|  | High molecular copolymer | Pigment dispersant | 0.90 | 0.90 | 0.90 | 0.90 | 0.90 | 0.90 |
|  | Ion-exchanged water | Water | 15.64 | 15.64 | 15.64 | 15.64 | 15.64 | 13.39 |
|  | Glycerin | Humectant | 8.10 | 8.10 | 8.10 | 8.10 | 8.10 | 8.10 |
|  | CHELESLITE | Rust inhibitor | 0.54 | 0.54 | 0.54 | 0.54 | 0.54 | 0.54 |
|  | SUROUT | Antiseptic agent | 0.15 | 0.15 | 0.15 | 0.15 | 0.15 | 0.15 |
|  | Potassium oleate | Lubricant | 0.75 | 0.75 | 0.75 | 0.75 | 0.75 | 0.75 |
|  | Laurylamine |  | 0.15 | 0.15 | 0.15 | 0.15 | 0.15 | 0.15 |
|  | Triethanolamine | pH regulator | 0.15 | 0.15 | 0.15 | 0.15 | 0.15 | 2.40 |
|  | Kayaphor SN conc. | Fluorescent whitener | — | — | — | — | — | — |
|  | Xanthan gum | Gelling agent | 0.11 | 0.11 | 0.11 | 0.11 | 0.11 | 0.11 |
|  | Fluorine-based surfactant | Surfactant | 0.21 | 0.21 | 0.21 | 0.21 | 0.21 | 0.21 |
|  | Low-molecular weight polyethylene aqueous dispersion | Lubricant | 0.60 | 0.60 | 0.60 | 0.60 | 0.60 | 0.60 |
|  | Aqueous component total |  | 30.00 | 30.00 | 30.00 | 30.00 | 30.00 | 30.00 |
|  | Aqueous component pH |  | 8.5 | 8.5 | 8.5 | 8.5 | 8.5 | 9.6 |
| Total |  |  | 100.00 | 100.00 | 100.00 | 100.00 | 100.00 | 100.00 |

Units for contents of components (starting materials) are "mass %", with "—" denoting a content of 0.

The details for the starting materials listed in Tables 1 to 3 are as follows.

FNP-35 Lemon Yellow: Trade name of Sinloihi Co., Ltd., sodium sulfonated styrene/divinylbenzene copolymer dyed with a fluorescent dye [C.I. Disperse Yellow 82].

FNP-34 Orange: Trade name of Sinloihi Co., Ltd., sodium sulfonated styrene/divinylbenzene copolymer dyed with fluorescent dyes [C.I. Disperse Yellow 83, C.I. Basic Red 1:1 and C.I. Solvent Red 49].

NKS-1005 Yellow: Trade name of Nihon Keiko Kagaku, fluorescent coloring agent, polyamide resin dyed with fluorescent dye [C.I. Basic Yellow 40].

FM-109 White: Trade name of Sinloihi Co., Ltd., mixture of formaldehyde-benzoguanamine resin and formaldehyde-p-toluenesulfonamide resin dyed with fluorescent dye [C.I. FBA 184].

PVP K-90: Trade name of Nippon Shokubai Co., Ltd.

Heterocyclic compound solution: Heterocyclic compound, benzyl alcohol solution.

EMULGEN 150: Trade name of Kao Corp., POE (47) lauryl ether (emulsifier).

EMULGEN LS-110: Trade name of Kao Corp., polyoxyalkylenealkyl ether.

C.I. Pigment Yellow: Product of Dainichiseika Color & Chemicals Mfg. Co., Ltd.

High molecular copolymer (pigment dispersant): Styrene-maleic acid copolymer.

CHELESLITE: Trade name of Chelest Corp.

SUROUT: Trade name of Japan EnviroChemicals, Ltd.

Kayaphor SN conc: Trade name of Nippon Kayaku Co., Ltd., stilbene derivative.

Kayaphor AS 150: Trade name of Nippon Kayaku Co., Ltd., stilbene derivative.

Hakkol OW-11: Trade name of Showa Chemical Industry Co., Ltd., stilbene derivative.

[Measurement of Water Droplet Mean Particle Size]

The ink compositions prepared for each of the examples and comparative examples were observed under an optical microscope (magnification: 250×), and the particle sizes of the water droplets composed of the aqueous components dispersed in the oil components were measured. In a photograph of the image observed with the optical microscope, 10 water droplets were arbitrarily selected and their diameters measured, and their arithmetic mean value was calculated. The arithmetic mean value was used as the mean particle size. The calculated results are shown in Table 4.

[Evaluation of Dispersibility and Emulsified Stability]

The ink compositions prepared for each of the examples and comparative examples were observed under an optical microscope (magnification: 250×), and the dispersibility and emulsified stability were evaluated on the following evaluation levels. The evaluation results are shown in Table 4.

A: Uniform particle sizes of water droplets (aqueous component), no coalescence or splitting of water droplets during microscopy.

B: Non-uniform particle sizes of water droplets (aqueous component), and gradual coalescence of water droplets during microscopy.

C: Coarse water droplets (aqueous component) with distorted shapes. Also, coalescence of the water droplets during microscopy at a faster rate than "B".

D: No water droplets (aqueous component) observed, no W/O-type emulsion formed.

[Evaluation of Writing Performance]

The ink composition of each example and comparative example was filled into a polypropylene cylindrical ink holding tube (inner diameter: 4.0 mm) for a ball-point pen, such as shown in FIG. 1, provided with a ball-point pen tip (ball diameter: 0.7 mm). Next, a backflow preventer comprising 95 mass % purified mineral oil and 5 mass % of a thickener (metal soap, elastomer) was packed into the end of the ink holding tube opposite the ball-point pen tip (the end behind the ink composition), adjacent to the ink composition. A pallet was then inserted at the back end of the main body axis of the ball-point pen, to complete the ball-point pen.

The ball-point pen was used for free-hand drawing on a paper sheet surface, and the writing performance was evaluated on the following evaluation levels. The results are shown in Table 4.

A: Extremely smooth.
B: Smooth.
C: Heavy, not smooth.

[Evaluation of Stability Over Time]

A ball-point pen produced in the same manner as for the "Evaluation of writing performance" described above was stored in a prescribed atmosphere (60° C., 25-95% RH) with the pen tip oriented downward, and the time until separation of the ink composition into the aqueous component and oil component was examined. The evaluation levels were as follows. The results are shown in Table 4.

A: No separation of ink composition for 60 days or longer.
B: Separation of ink composition within 8 to 59 days.
C: Separation of ink composition within 1 to 7 days.

TABLE 4

|  | Mean particle size (μm) | Dispersion and emulsion stability | Writing performance | Stability over time |
|---|---|---|---|---|
| Example 1 | 0.8 | A | A | A |
| Example 2 | 1.0 | A | A | A |
| Example 3 | 1.2 | A | A | B |
| Example 4 | 1.0 | A | A | A |
| Example 5 | 1.0 | A | A | A |
| Example 6 | 1.0 | A | B | A |
| Example 7 | 1.0 | A | B | B |
| Example 8 | 1.0 | A | A | B |
| Example 9 | 1.2 | A | A | B |
| Comp. Ex. 1 | 2.0 | C | B | C |
| Comp. Ex. 2 | Unmeasurable | D | C | C |
| Comp. Ex. 3 | 1.6 | B | B | C |
| Comp. Ex. 4 | 2.0 | C | B | C |
| Comp. Ex. 5 | 2.0 | C | B | C |
| Comp. Ex. 6 | 1.8 | B | B | B |

As shown in Table 4, it was confirmed that the ink compositions of Examples 1 to 9 formed W/O-type emulsions with small water droplet mean particle sizes and excellent dispersibility. It was also confirmed that the ink compositions of Examples 1 to 9 exhibited excellent writing performance and stability of the ink compositions over time. On the other hand, the ink compositions of Comparative Examples 1 to 6, which did not comprise a fluorescent whitening agent, had less uniform water droplet particle sizes and less satisfactory water droplet dispersibility than Examples 1 to 9. In addition, there was no improvement in the emulsion dispersibility or stability over time, even with addition of an emulsifier (Comparative Examples 4 and 5). The ink composition of Comparative Example 6, which had an increased pH by increased addition of a pH regulator, also had inferior emulsion dispersibility and emulsified stability compared to Examples 1 to 9.

INDUSTRIAL APPLICABILITY

According to the invention it is possible to provide a W/O-type emulsion ink composition for a writing tool which has satisfactory dispersibility of the aqueous component in the oil component, even with fluorescent color, and which has excellent emulsified stability of the emulsion, and excellent writing performance. It is also possible to provide a writing tool with satisfactory writing performance.

Reference Signs List

10: Core, 12: ink composition, 14: ink holding tube, 16: backflow preventer, 18: main body axis, 20: ball-point pen tip, 22: joint, 24: ball holder, 26: ball, 28: pallet, 100: ball-point pen.

The invention claimed is:

1. A W/O emulsion ink composition for a writing tool, comprising:
    an oil component; and
    an aqueous component dispersed in the oil component;
    wherein the oil component includes a fluorescent coloring agent, and the aqueous component includes a fluorescent whitening agent and water.

2. The W/O emulsion ink composition for a writing tool according to claim 1, wherein the fluorescent whitening agent has a stilbene structure.

3. The W/O emulsion ink composition for a writing tool according to claim 1, wherein the pH of the aqueous component is 8.9 or higher.

4. The W/O emulsion ink composition for a writing tool according to claim 1, wherein the mass ratio of the oil component with respect to the aqueous component is between 1.5 and 4.

5. A writing tool comprising the W/O emulsion ink composition for a writing tool according to claim 1.

6. The W/O emulsion ink composition for a writing tool according to claim 2, wherein the pH of the aqueous component is 8.9 or higher.

7. The W/O emulsion ink composition for a writing tool according to claim 2, wherein the mass ratio of the oil component with respect to the aqueous component is between 1.5 and 4.

8. The W/O emulsion ink composition for a writing tool according to claim 3, wherein the mass ratio of the oil component with respect to the aqueous component is between 1.5 and 4.

* * * * *